ELECTROCHEMICALLY CONTROLLED SHAPING OF SEMICONDUCTORS

Filed Dec. 16, 1969

INVENTOR
H.A. WAGGENER
BY
Arthur J. Torsiglieri
ATTORNEY

United States Patent Office 3,689,389
Patented Sept. 5, 1972

3,689,389

ELECTROCHEMICALLY CONTROLLED SHAPING OF SEMICONDUCTORS

Herbert A. Waggener, Allentown, Pa., assignor to Bell Telephone Laboratories, Incorporated, Murray Hill, N.J.

Filed Dec. 16, 1969, Ser. No. 885,605
Int. Cl. B23p *1/00;* C23f *13/00;* H01l *7/00*
U.S. Cl. 204—147 10 Claims

ABSTRACT OF THE DISCLOSURE

A method for selectively etching a semiconductor, particularly applicable to precision thinning of silicon integrated circuit wafers. The semiconductor and a cathode are inserted in an electrolyte which etches the semiconductor in the absence of applied voltage to the cathode, and all of the semiconductor portions, which are at a potential less than some passivation potential, are etched away. Those semiconductor portions which are at a potential greater than the passivation potential are not etched. In practice, a suitable voltage differential (above and below the passivation potential) can exist across a PN junction, so that the etching stops automatically at a junction, the location of which can be accurately predetermined. Alternatively, series resistance can be used to provide a suitable voltage differential across preselected portions of a semiconductor body. For silicon, the passivation potential is about 0.5 volt where the electrolyte is potassium hydroxide in equilibrium with air and the cathode is platinum.

BACKGROUND OF THE INVENTION

This invention relates generally to methods for fabricating semiconductor devices; and, more particularly, to a method for electrochemically controlled shaping of semiconductors.

Over the years since the invention of the transistor there has been a dramatic increase in the commercial use and importance of semiconductor devices until today it is a multibillion-dollar segment of American industry. As the semiconductor art has evolved, there has always been a need for methods for controlled shaping of semiconductor bodies. Initially, this controlled shaping took the form of mechanical means such as scribing and breaking or sand-blasting, but as the art progressed to ever smaller devices, these mechanical means were unable to adapt in a commercially practical way to the smaller sizes. Accordingly, there has been considerable effort directed toward finding chemical means, such as etching, for the controlled shaping of semiconductor bodies.

Early in the art, germanium was the prominent semiconductor used; and several electrochemical techniques for the controlled shaping of germanium bodies were developed. See, e.g., the disclosures in U.S. Pat. No. 2,656,496, issued Oct. 20, 1953, to M. Sparks, and in U.S. Pat. No. 2,850,444, issued Sept. 2, 1958 to L. D. Armstrong et al. While these disclosures were in some ways satisfactory for germanium, they have provided quite unsatisfactory in most applications involving silicon, which has since replaced germanium as the prominent semiconductor material.

In U.S. Pat. No. 2,847,287, issued Aug. 12, 1958 to C. R. Landgren, there is disclosed a technique for selectively etching P-type portions of a silicon body which includes additional regions of other type semiconductivity. Unfortunately, this technique suffers from a relatively slow etching rate and appears to be limited in being capable of etching only P-type semiconductivity from an N-type background.

In U.S. Pat. No. 3,418,226 issued Dec. 24, 1968 to J. C. Marinace, there is disclosed a method of selectively electrolytically etching degenerate P-type material from less heavily doped P-type material in the same semiconductive body. Unfortunately, the Marinace disclosure is limited to selective etching of degenerate P-type in gallium arsenide and appears to be of at most limited interest for other situations.

A recently published Dutch patent application, No. 6703013, filed in Netherlands on Feb. 25, 1967, and published Aug. 26, 1968, discloses an electrochemical thinning process for silicon and has aroused considerable interest in the art because of its apparent potential for producing ultrathin (1 micron) silicon for such applications as high power, high frequency devices and large packing density, air isolated or dielectric isolated silicon integrated circuits. Unfortunately, the Dutch disclosure is limited to the removal of very low resistivity N-type silicon from relatively high resistivity N-type regions. This is a problem in that, for the majority of present day silicon integrated circuit devices, the exact converse is desired, i.e., it is more generally desired to remove the high resistivity portions from a relatively low resistivity epitaxial layer. More specifically, it is more commonly desired to remove a relatively high resistivity substrate or bulk portion from an overlying epitaxial or diffused layer of a relatively lower resistivity, without regard to the type of semiconductivity, so that the remaining layer contributes only a minimum parasitic resistance to devices fabricated therein or thereon.

SUMMARY OF THE INVENTION

In view of these and other limitations inherent in the aforementioned and other prior art techniques for shaping semiconductor bodies, it is an object of this invention to provide a method for controlled selective shaping of semiconductor bodies without substantial regard to the type semiconductivity or to the degree of resistivity contained therein.

More specifically, it is an object of my invention to provide a self-terminating method for selectively etching predetermined portions of a semiconductor body in such a manner that the depth of the etch is relatively independent of the time the body is immersed in the etching ambient.

Still more specifically, it is an object of my invention to achieve the aforementioned objectives with respect to silicon semiconductor bodies.

To these and other ends, an important characteristic of my invention is a step in which the semiconductor body is etched in a solution which is a chemical etchant for the semiconductor irrespective of semiconductivity type. That is, the etchant solution is of a type which etches the semiconductor at an appreciable rate unless there is a voltage applied thereto with respect to a cathode which is greater than a predetermined passivation potential.

More specifically, in accordance with my invention, the selective removal of semiconductor material is accomplished in a solution which etches the semiconductor in the absence of applied voltage but in which the etching rate is appreciably reduced when a particular voltage is applied with respect to a cathode. For example, I have found that a silicon body of either type semiconductivity which is doped to a concentration of less than about $10^{20}$ atoms per cubic centimeter is etched relatively rapidly if simply immersed in a potassium hydroxide solution. However, if a positive potential of greater than about 0.5 volt with respect to a platinum cathode is applied to the silicon body, all those portions of the silicon which are at least about 0.5 volt positive are substantially passivated. That is, those portions at least about 0.5 volt positive are etched at a rate of at least 10 times slower (typically 200–10,000 times slower) than those portions which are at a voltage less than about the 0.5 volt. For this reason, the "passivation potential" of this silicon-potassium hydroxide-platinum system is considered to be about 0.5 volt.

In one class of embodiments of my invention the semiconductor body includes a PN junction over which a voltage drop is maintained so that some portions of the semiconductor on one side of the PN junction are at a more positive potential than the passivation potential and those semiconductor portions on the other side of the PN junctions are at a potential less than the passivation potential. With this potential distribution, those semiconductor portions at a voltage less than the passivation potential are etched until enough material is removed so that the junction is exposed. Once the junction is exposed, the semiconductor passivates with respect to the solution and the etching effectively stops, i.e., the etch rate is reduced by a factor of at least an order of magnitude and typically by as much as 200–10,000.

In another class of embodiments of my invention a potential distribution is established within a semiconductor body by suitable placement of electrodes and potentials and using resistive and field effect techniques. Once this potential distribution is established in whatever configuration desired, the semiconductor will be etched in all those portions exposed to the etchant solution which are at a potential of less than about the passivation potential.

BRIEF DESCRIPTION OF THE DRAWING

The invention will be better understood from the following more detailed description taken in conjunction with the accompanying drawing, in which.

DETAILED DESCRIPTION

Figure 1:
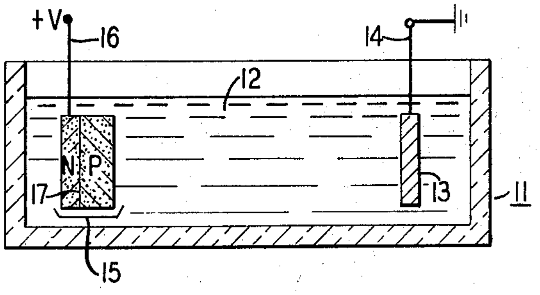
FIG. 1 shows schematically an arrangement for accomplishing the selective removal of P-type semiconductor material from N-type, in accordance with my invention.
Figure 2:
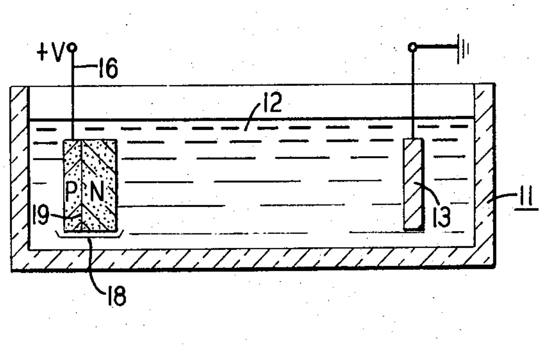
FIG. 2 shows schematically an arrangement for accomplishing the selective removal of N-type semiconductor material from P-type, in accordance with my invention.

With more specific reference now to the drawing, in FIGS. 1 and 2 there is shown schematically the basic apparatus for carrying out my invention. As shown, the apparatus comprises a suitable container 11 of a material resistant to the etchants 12 employed. A cathode 13 is at least partially immersed in the etchant 12 and suitable means 14 for connecting the cathode to external circuitry for the application of a controlling potential (+V) are provided. The cathode advantageously is a material which does not dissolve and deleteriously contaminate the electrolyte, e.g., platinum, gold, or the same material as the body to be etched.

As shown in FIG. 1, a semiconductor body 15 includes a P-type portion which is to be etched and an N-type portion (both so labeled) which is to remain after the etching ceases. Semiconductor 15 is immersed in the electrolyte, advantageously in spaced relationship with the cathode. Means 16 also are provided for connecting some portion of semiconductor 15 to the circuitry for providing the controlling potential (+V). It will be noted in FIG. 1 that the positive potential is connected only to the N-type portion of the semiconductor and that the P-type portion is separated from the N-type portion by a PN-junction 17.

It will be appreciated that means 16 advantageously are arranged such that the entirety of layer 17 is maintained at a potential greater than the passivation potential. Junction 17 provides a suitable voltage barrier so that the N-type portion can be maintained at a voltage greater than the passivation potential while the P-type portion is at a potential less than the passivation potential with respect to the cathode 13.

As mentioned hereinabove, the etchant is selected from the class of chemical etchants which etch at an appreciable rate only those portions of the semiconductor which are at a potential less than some passivation potential with respect to the cathode.

As the etching proceeds, the etching process is manifested by a visually observable evolution of hydrogen gas from the semiconductor surfaces being etched. Conversely, those surfaces which are not being attacked at an appreciable rate by the etchant evince no visually observable hydrogen evolution. Accordingly, the etching process can be conveniently monitored by observing the presence or absence of the hydrogen gas evolution.

More specifically, as the etching proceeds, a voluminous amount of visually observable hydrogen gas bubbles appear to be continuously evolved from the surfaces being etched. However, once the P-type material is entirely removed so that the region around the position of metallurgical junction 17 is exposed to the etchant, all semiconductor surfaces exposed to the etchant are then at a potential greater than the passivation potential; and the etching substantially stops. This stoppage is evidenced by a sudden and dramatic stopping of hydrogen gas evolution, i.e., the hydrogen gas evolution ceases to be discernible to the naked eye.

I have found that once the hydrogen gas ceases to be involved, the etch rate has been reduced by at least an order of magnitude and typically by as much as a factor of 200–10,000 compared with the etch rate during the time hydrogen gas is evolved.

Because of the dramatic decrease in etching rate and because of the visually observable stoppage of hydrogen gas evolution, there is adequate time (of the order of hours) during which the stoppage of hydrogen evolution can be detected and in which the remaining N-type semiconductor can be removed from the etchant before there has been appreciable attack of the N-type material by the etchant.

Of course the hydrogen gas evolution need not be detected visually and the semiconductor need not be removed from the etchant manually. It will be apparent that a hydrogen gas detector may be placed in or near the etchant and that electrical and mechanical means may be coupled to the gas detector so that the semiconductor is automatically withdrawn from the etchant when hyrogen gas has ceased to be evolved. The actual design of such automation means is within the skill of the art and will not be described further herein.

The illustration in FIG. 2 is substantially the same as that in FIG. 1 except that the semiconductor body 18 includes an N-type portion which is to be removed and a P-type portion (both so labeled) which is to remain after the etching ceases. The N-type is removed by connecting P-type layer 19 to a voltage (+V) sufficient to maintain the entire P-type layer at a potential greater than the passivation potential.

Various modifications and improvements may be made to the aforeemntioned procedure by the worker in the art to establish a desired degree of practicality in his particular processing application. For example, the semiconductor body may be mounted with a wax or a resin to a premetallized conductive or dielectric carrier leaving only the surfaces to be etched exposed so that surfaces not to be etched areadditionally protected from the etchant and so that handling of the semiconductor and application of controlling potentials thereby are facilitated.

While the process in accordance with my invention can be practiced with a variety of semiconductor materials, electrolytes, and other parameters, the process has been found to give excellent results where the following ranges of materials and other parameters are used. For the purpose of exposition only, the examples are directed to etching silicon.

Samples to be etched have included surface layers (either epitaxially formed or diffused, or both) over a bulk portion. Typically, the bulk has been doped to a concentration of less than about $10^{20}$ atoms per cubic centimeter. The thickness of the surface layer has been typically between about 1–15 microns; however, the thickness of the surface layer clearly is not critical. To facilitate handling in the electrolyte, the samples have been mounted using a resin or wax on a ceramic disc, and then immersed in the electrolyte which, for example, has been between about 1–7 normal potassium hydroxide. A platinum cathode has been used, although any other material may as well be used provided it does not contaminate substantially the electrolyte used. Generally, I have maintained the temperature of the electrolyte at about 70 to 100 degrees centigrade to produce an optimum etching rate. Although the rate is variable with applied bias, I have found that P-type silicon doped to a concentration of about $10^{18}$ atoms per cubic centimeter etches at approximately 2–4 microns per minute in a 5 normal potassium hydroxide solution maintained at about 95 degrees centigrade; and that when the junction is reached an oxide layer immediately grows upon the exposed surfaces. The etch rate of this oxide is about 200 times slower than the etch rate of the P-type material.

Although the aforementioned specific examples were described with respect to using potassium hydroxide as the etchant, the other metal hydroxides of the Group I–A elements of Periodic Table of the Elements may as well be used. This group includes the hydroxides of sodium, rubidium, cesium, and lithium. Ammonium hydroxide and the alkyl substituted ammonium hydroxides, e.g., tetramethylammoniumhydroxide and tetraethylammoniumhydroxide, also may as well be used.

Figure 3:
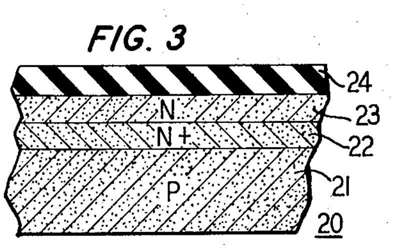
FIGS. 3 and 4 show a portion of cross sections of semiconductive wafers which are conveniently etched in accordance with my invention.
Figure 4:
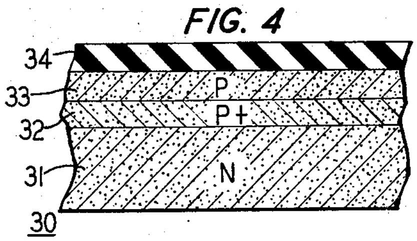

With more specific reference now to FIGS. 3 and 4, there are shown portions of cross sections of semiconductor wafers having structures which are advantageously etched in accordance with my invention. In FIG. 3 there is shown a wafer portion 20 which includes a P-type substrate 21 over which there have been formed an $N^+$-type layer 22 and an N-type layer 23. A coating 24 of a material selected for its resistance to etching in the solution to be employed is shown over layer 23 for additional protection during the etching process. P-type layer 21 advantageously is of a relatively high resistivity, e.g., doped ot an impurity concentration of less than of about $10^{18}$ acceptor atoms per cubic centimeter, so that spreading resistance within the bulk portion 21 itself would be sufficient to prevent a junction defect in the junction between layers 21 and 22 from providing enough current to cause the sample to passivate before the P-type 21 was completely removed. To perform the etching, an electrical connection is made to either the $N^+$-type layer 22 or to the N-type layer 23 or to both and then this electrical connection is supplied with a positive potential (+V) greater than the passivation potential with respect to the cathode in the etching system. The structure shown in FIG. 3 is generally considered advantageous starting material for manufacturing air isolated monolithic circuits of the type described in U.S. Pat. No. 3,335,338, issued Aug. 8, 1967 to M. P. Lepselter and assigned to the assignee hereof.

In FIG. 4 there is shown a dual structure to the one shown in FIG. 3, i.e., a wafter portion 30 includes an N-type substrate 31 over which there has been formed a $P^+$ layer 32 and a less heavier doped P-type layer 33. Again, a coating 34 has been formed over the surface layers to provide additional protection from the etching solution during the etching process. To etch sample 30, the P-type layer 33 or the P-type layer 32 or both are connected to a potential positive with respect to the cathode as in the aforementioned examples. However, it will be noted that there is a limit on the magnitude of positive potential which can be employed for this procedure since an excessive positive potential will forward bias the PN junction between layers 31 and substrate 32 and allow sufficient current to flow so that the N-type portion 31 will passivate rather than etch. I have found that where wafer portion 30 includes silicon bulk portions and surface layers, and where the electrolyte used for etching is potassium hydroxide of about 7 normal and where the cathode is platinum, a suitable potential to be applied to $P^+$ layer 32 is about 0.65 volt. This potential is sufficiently high to cause $P^+$ layer 32 to passivate once the N-type substrate 31 has been etched away and yet is not sufficient to cause the PN-junction between layer 32 and N-type substrate 31 to become sufficiently forward biased to cause substrate 31 to passivate prior to its complete removal.

It should be noted at this point that with certain of the aforementioned etchant solutions e.g., potassium hydroxide, there are different etch rates with respect to different crystallographic planes within the silicon semiconductor material. For example, using potassium hydroxide to etch silicon, it is well known that the etch rate as to planes parallel to the (100) crystallographic plane is considerably higher than the etch rate with respect to the planes parallel to the (111) crystallographic plane. This is disclosed in more detail in the copending U.S. application Ser. No. 603,292, filed Dec. 20, 1966, in the names of R. C. Kragness-H. A. Waggener and assigned to the assignee hereof. Still more specifically, the etch rate as to the (111) planes is so low that the worker in the art might experience difficulty in determining when the etch has stopped when proceeding in accordance with the instant invention.

Figure 5:
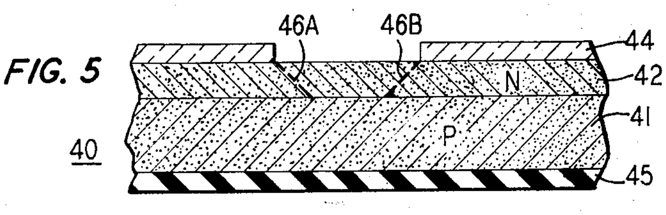
FIG. 5 shows a portion of a semiconductor wafer prepared for etching selectively a slot to a predetermined depth in a semiconductor surface, in accordance with my invention.

However, the aforementioned etch rate limitation points toward another advantageous embodiment of my invention. There is shown in FIG. 5 a wafer portion prepared for selectively etching a surface slot in accordance with the following embodiment of my invention. Wafer portion 40 includes a first semiconductor portion 41 contiguous with and forming a PN-junction with a layer 42 of opposite conductivity type. Over the surface of layer 42 there has been formed an apertured mask of a material which is resistant to the etchant solution to be employed. As in FIGS. 3 and 4, the surface which is not to be etched at all, i.e., the surface of portion 41, is coated with an etch-resistant material 45 to provide additional protection during the etching process.

In accordance with this embodiment, the surface of layer portion 42 is made substantially parallel to the (100) plane of the semiconductor. The sample is placed in a potassium hydroxide solution, and the bulk portion 41 is connected to a source of positive potential equal to or greater than the passivation potential. Under these conditions, the exposed portion of layer 42 will be etched until the PN-junction between layers 42 and 41 is exposed at which time the etching will stop. The etching will only proceed laterally as far as the broken line side-lines 46A and 46B because of the preferential etch rates with respect to crystallographic planes, as described above. The technique of FIG. 5 may, of course, be used for forming voids of arbitrary shape and in particular for forming slots as are often used in dielectric isolated integrated circuits. The depth of the void is, of course, controlled by the metallurgical position of the first PN-junction beneath the surface.

Figure 6:
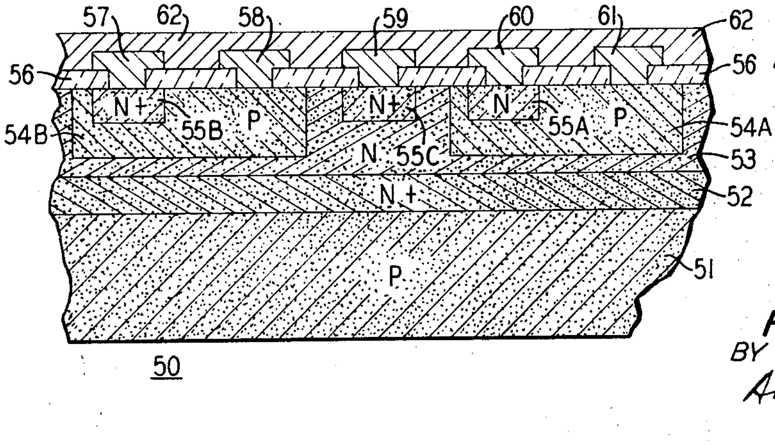
FIG. 6 shows a cross section of a portion of a semiconductor wafer illustrating one of the many possible ways of connecting a potential to a portion of the semiconductor body for controlling the selective etching in accordance with my invention.

Referring now to FIG. 6, there is shown a portion 50 of a cross section of a semiconductor wafer illustrating one of the many possible ways of connecting a potential to a portion of a semiconductor body for controlling selective etching in accordance with my invention.

More specifically, wafer 50 has been prefabricated in accordance with the objective of producing an air isolated or dielectric isolated semiconductor integrated circuit. As shown, there is a relatively high resistivity P-type substrate 51 over which $N^+$-type layer 52 and less heavily doped N-type layer 53 have been formed, for example, by epitaxial deposition or by diffusion or by ion implantation or by any of the variety of other techniques well known in the art for altering the semiconductivity of a semiconductor body. Into layer 53 there have been formed localized zones 54A and 54B of P-type semiconductivity to provide resistors or base regions of transistors within the integrated circuit. Nested within P-type zones 54A and 54B are a plurality of $N^+$-type zones 55A and 55B for providing, for example, emitter zones of transistors within the integrated circuit. $N^+$-type zone 55C has been formed to enable facile fabrication of a low resistance contact to the collector of the transistor via an electrode 59 on the surface. A passivating dielectric layer 56 overlies the semiconductor surface in all portions except where metallic electrodes 57, 58, 59, 60, and 61 extend through the dielectric layer to form a low resistance connection to the respective semiconductive zones therebeneath. Over the passivating dielectric layer 56 and over the aforementioned electrodes there has been formed a continuous and relatively uniform conductive layer 62, for example, of an inert metal such as platinum or gold.

To remove the P-type substrate 51 prior to etching slots from the bottom of layer 52 into the rest of the semiconductor to provide air isolation or dielectric isolation, the entire wafer 50 is immersed in an arrangement such as shown in FIG. 1; and the positive potential is applied to the conductive overlayer 62 which serves to distribute the potential and to protect the surface of the semiconductor from etching during the etching procedure. The potential is distributed through the conductive overlayer 62 and is applied substantially uniformly through a zone, such as zone 55C, to the $N^+$-type layer 52. In this manner the P-type material 51 is completely removed until the junction between P-type substrate 15 and $N^+$-type layer 52 is exposed. Once the junction is exposed, a current flows and an oxide layer grows on the then-exposed bottom of layer 52 and the semiconductor passivates, all in accordance with my aforementioned more generally described procedures.

The foregoing disclosure has been primarily in terms of monocrystalline silicon semiconductor material etched in a hot (70–100 degrees centigrade) aqueous alkaline solution with a positive potential applied. It is to be understood that the upper limit (100° C.) specified for the temperature range is not critical. Temperatures up to and including the boiling temperature may also be used.

It will be apparent to those skilled in the art that these procedures are generally applicable to other crystalline semiconductor materials, including germanium and the well-known III–V and II–VI compound semiconductors. The primary criterion is that the semiconductor be able to form an adherent passivating coating in the etching solution employed so as to achieve a dramatic difference in etch rate for all those semiconductor portions to which there is applied a potential greater than some passivation potential.

It will be understood that departures from the foregoing specific teachings may be made by those skilled in the art which however still come within the scope and spirit of my invention. For example, it would be apparent to those skilled in the semiconductor art that other systems for etching semiconductors in a controlled fashion may be devised consistent with my general premise of having the dramatically different etch rate for portions of the semiconductor body which are at a potential on one side or the other of a given passivation potential as defined hereinabove.

I claim:

1. A method of fabricating a silicon semiconductor device including the steps of:

immersing a silicon semiconductor body in an etching solution selected from the group consisting of those solutions which etch silicon chemically in the absence of any applied voltage between the silicon and the solution and in which the silicon can be substantially passivated to the extent that the etch rate is reduced by at least a factor of ten by applying to the silicon a sufficiently positive passivation potential with respect to the solution;

immersing in the solution a cathode;

establishing and maintaining selectively in the body a potential distribution sufficient that portions not to be appreciably etched are maintained at a potential at least as great as the passivation potential with respect to the cathode in the solution, and portions to be appreciably etched are maintained at potentials less than said passivation potential with respect to the cathode in the solution;

whereby those portions of the silicon body which are at a voltage level less than the passivation potential are etched preferentially and those portions of the silicon body which are at a voltage level at least as great as the potential level are not appreciably etched.

2. A method of fabricating a silicon semiconductor device comprising the steps of:

providing a silicon semiconductor body including a first portion substantially of a first type semiconductivity and a layer of opposite type semiconductivity over and contiguous with a surface of the first portion and having a PN junction therebetween;

coating at least a portion of the surface of the layer with a material which resists etching;

immersing the body in an etching solution selected from the group consisting of the aqueous alkaline solutions which etch the body in the absence of applied voltage and in which the body passivates to the extent that the etch rate is reduced by at least a factor of ten at a potential at least as great as a predeterminable passivation potential;

immersing in the solution a cathode;

applying between the layer and the cathode a voltage of polarity such that the layer is positive with respect to the cathode and with respect to the first portion;

the magnitude of the applied voltage being at least as great as the passivation potential at which the silicon layer passivates with respect to the etching solution and insufficiently great to passivate the first portion with respect to the etching solution;

whereby the first portion is etched preferentially to the depth of the PN junction, after which the remaining layer is substantially passivated with respect to the etching solution.

3. A method as recited in claim 2 wherein the applied voltage is about 0.65 volt and the etching solution is potassium hydroxide.

4. A method of fabricating a silicon semiconductor device including the steps of:

immersing a silicon semiconductor body in an etching solution selected from the group consisting of (a) the metal hydroxide of the Group I–A elements of the Periodic Table of Elements and (b) ammonium hydroxide and the alkyl substituted ammonium hydroxides;

immersing in the solution a cathode;

establishing and maintaining selectively in the body a potential distribution sufficient that portions not to be appreciably etched are maintained at a potential at least as great as the passivation potential with respect to the cathode in the solution, and portions to be appreciably etched are maintained at potentials less than said passivation potential with respect to the cathode in the solution;

whereby those portions of the silicon body which are at a voltage level less than the passivation potential are etched preferentially and those portions of the silicon body which are at a voltage level at least as great as the potential level are not appreciably etched.

5. A method as recited in claim 4 wherein:

the silicon body includes a first portion substantially of a first type semiconductivity and a layer of opposite type semiconductivity over and contiguous with a surface of the first portion and having a PN junction therebetween; and the potential distribution is established by applying a voltage to the layer through an electrode contiguous with the layer so that the first portion in preferentially etched.

6. A method as recited in claim 5 wherein the first portion is of higher resistivity than the layer portion.

7. A method as recited in claim 4 additionally comprising the step of removing the remaining portions of the body from the etchant only after substantially all portions below the passivation potential have been removed.

8. A method as recited in claim 4 wherein the body includes a rectifying barrier which cooperates in establishing the potential distribution to the extent that substantially all portions of the body on one side of the barrier are at a potential less than the passivation potential and substantially all portions of the body on the other side of the barrier are at a potential greater than the passivation potential.

9. A method as recited in claim 4 additionally comprising the step of removing the body from the etchant after hydrogen gas evolution has ceased to be visually discernible.

10. A method as recited in claim 9 wherein the body is removed from the etchant within one hour after hydrogen gas evolution has ceased to be visually discernible.

References Cited

UNITED STATES PATENTS

| | | | |
|---|---|---|---|
| 2,998,362 | 8/1961 | Hall | 156—17 |
| 3,266,961 | 8/1966 | Emeis | 156—17 |
| 3,117,899 | 1/1964 | McLouski | 204—143GE |
| 2,656,496 | 10/1953 | Sparks | 204—143 GE |
| 3,096,262 | 7/1963 | Shockley | 204—143 GE |
| 3,418,226 | 12/1968 | Marinace | 204—143 GE |
| 2,695,930 | 11/1954 | Wallace, Jr. | 204—143 GE |
| 2,850,444 | 9/1958 | Armstrong et al. | 204—143 GE |

FOREIGN PATENTS

| | | | |
|---|---|---|---|
| 1,213,056 | 3/1966 | Germany | 204—143 GE |
| 6,703,013 | 8/1966 | Netherlands | 204—143 GE |
| 6,703,014 | 8/1968 | Netherlands | 204—143 GE |

OTHER REFERENCES

Russian Journal of Physical Chemistry, June 1962, pp. 659–664, vol. 36, No. 6.

JOHN H. MACK, Primary Examiner

R. J. FAY, Assistant Examiner

U.S. Cl. X.R.

156—17; 204—32 S, 143 GE, 196